US012791104B2

(12) United States Patent
Peng

(10) Patent No.: US 12,791,104 B2
(45) Date of Patent: Nov. 10, 2026

(54) VALVE CORE AND ITS INNER COMPONENT

(71) Applicant: KUCHING INTERNATIONAL LTD., Taichung City (TW)

(72) Inventor: Hao-Nan Peng, Taichung City (TW)

( * ) Notice: Subject to any disclaimer, the term of this patent is extended or adjusted under 35 U.S.C. 154(b) by 0 days.

(21) Appl. No.: 19/024,402

(22) Filed: Jan. 16, 2025

(65) Prior Publication Data

US 2026/0201964 A1 Jul. 16, 2026

(51) Int. Cl.
*F16K 11/074* (2006.01)
*F16K 11/078* (2006.01)

(52) U.S. Cl.
CPC ...... *F16K 11/0743* (2013.01); *F16K 11/0787* (2013.01)

(58) Field of Classification Search
CPC .......................... F16K 11/0743; F16K 11/0787
See application file for complete search history.

(56) References Cited

U.S. PATENT DOCUMENTS

| | | | | |
|---|---|---|---|---|
| 11,060,622 | B2 * | 7/2021 | Sell | F16K 11/0787 |
| 11,174,626 | B2 * | 11/2021 | Kobayashi | F16K 11/078 |
| 11,781,661 | B1 * | 10/2023 | Zhang | F16K 11/056 137/625 |
| 12,473,985 | B2 * | 11/2025 | Ma | F16K 11/0787 |

* cited by examiner

*Primary Examiner* — Kevin F Murphy
(74) *Attorney, Agent, or Firm* — Egbert, McDaniel & Swartz, PLLC

(57) ABSTRACT

Disclosed is a valve core and its inner component. The valve core has a valve body, a valve stem, an inner component, a movable valve disc, a fixed valve disc, and a valve seat. The inner component, the movable valve disc, and the fixed valve disc are assembled within the valve body. The inner component is controlled by the valve stem to drive the movable valve disc and has its radial periphery adjacent to the valve body. The valve stem is connected to the inner component and extends outside the valve body. The inner component has an actuating disc with clamping portions to clamp the movable valve disc, and a protective disc is connected to the actuating disc. The actuating disc is made of resin material, the protective disc is made of wear-resistant metallic material, and the actuating disc is positioned within the axial projection range of the protective disc.

10 Claims, 5 Drawing Sheets

VALVE CORE AND ITS INNER COMPONENT

CROSS-REFERENCE TO RELATED APPLICATIONS

Not applicable.

FIELD OF THE INVENTION

The present invention relates to fluid control devices for pipelines and more particularly to a valve core and its inner component, wherein the valve core is configured to control fluid flow.

BACKGROUND OF THE INVENTION

Valve cores are pipeline devices used for fluid control and can function as flow control valves or mixing valves.

A conventional valve core comprises a valve body, a valve stem, an inner component, a movable valve disc, a fixed valve disc, and a valve seat. The inner component, the movable valve disc, and the fixed valve disc are assembled within the valve body. The movable and fixed valve discs are typically made of ceramic materials and are tightly stacked together. The inner component is made of a resin material and is connected to the movable valve disc. The valve seat is located at one end of the valve body and is connected to the fixed valve disc. One end of the valve stem is connected to the inner component, while the other end extends outside the valve body.

The fixed valve disc is provided with multiple through slots, while the movable valve disc has a confluence groove on the side facing the fixed valve disc. Lateral rotation of the valve stem causes the inner component to move laterally, driving the movable valve disc to slide relative to the fixed valve disc. This movement alters the alignment between the confluence groove and the through slots, thereby controlling whether the fluid entering at least one through slot via the valve seat flows into the confluence groove. If the fluid enters the confluence groove, it subsequently exits the valve core through another through slot and the valve seat, allowing the valve core to regulate fluid flow.

By rotating the valve stem to move the movable valve disc, the flow passage area between the confluence groove and each through slot is varied. This variation controls the flow rate of fluid between the through slots and the confluence groove, thereby regulating the overall flow rate of the fluid passing through the valve core. In addition, the number and configuration of the through slots may be varied to control the mixing ratio of the fluids from different sources in the confluence groove.

During operation, as the valve stem drives the inner component to move or rotate, the radial outer periphery of the inner component comes into contact with the valve body. This contact generates friction between the inner component and the valve body, which can lead to wear of the resin-made inner component over time.

SUMMARY OF THE INVENTION

The main purpose of the present invention is to provide a valve core and its inner component.

In order to achieve this purpose, the present invention employs the following technical solution:

The valve core comprises a valve body, a valve stem, a rotating seat, an inner component, a movable valve disc, a fixed valve disc, and a valve seat. The rotating seat, the inner component, the movable valve disc, and the fixed valve disc are sequentially arranged along the axial direction within the valve body. The movable valve disc and the fixed valve disc are made of ceramic material and are tightly stacked together. The fixed valve disc includes multiple through slots, while the movable valve disc has a confluence groove on the side facing the fixed valve disc. The inner component is connected to the movable valve disc and is controlled by the valve stem to drive the movable valve disc. The radial periphery of the inner component is positioned adjacent to the valve body. The valve seat is assembled at one end of the valve body, and the fixed valve disc is connected to the valve seat. The valve stem is pivotally connected to the rotating seat via an axial rod. One end of the valve stem is pivotally connected to the inner component, while the other end extends outward from the valve body.

The inner component comprises an actuating disc and a protective disc. The actuating disc is a disc-shaped structure made of a resin material, while the protective disc is a disc-shaped structure made of a wear-resistant metallic material. The actuating disc and the protective disc are arranged sequentially along the axial direction, with the protective disc connected to the actuating disc. The actuating disc includes multiple clamping portions on its side opposite the protective disc, which are configured to clamp the movable valve disc. In addition, the actuating disc is positioned within the range of the normal projection of the protective disc along its axial direction.

During operation, as the valve stem drives the inner component to move or rotate, the wear-resistant metallic protective disc can withstand contact friction with the valve body without being easily damaged or deformed. This design allows the actuating disc to maintain its intended trajectory, ensuring the effective operation of the movable valve disc while enhancing durability and performance.

DETAILED DESCRIPTION OF THE INVENTION

Figure 1:
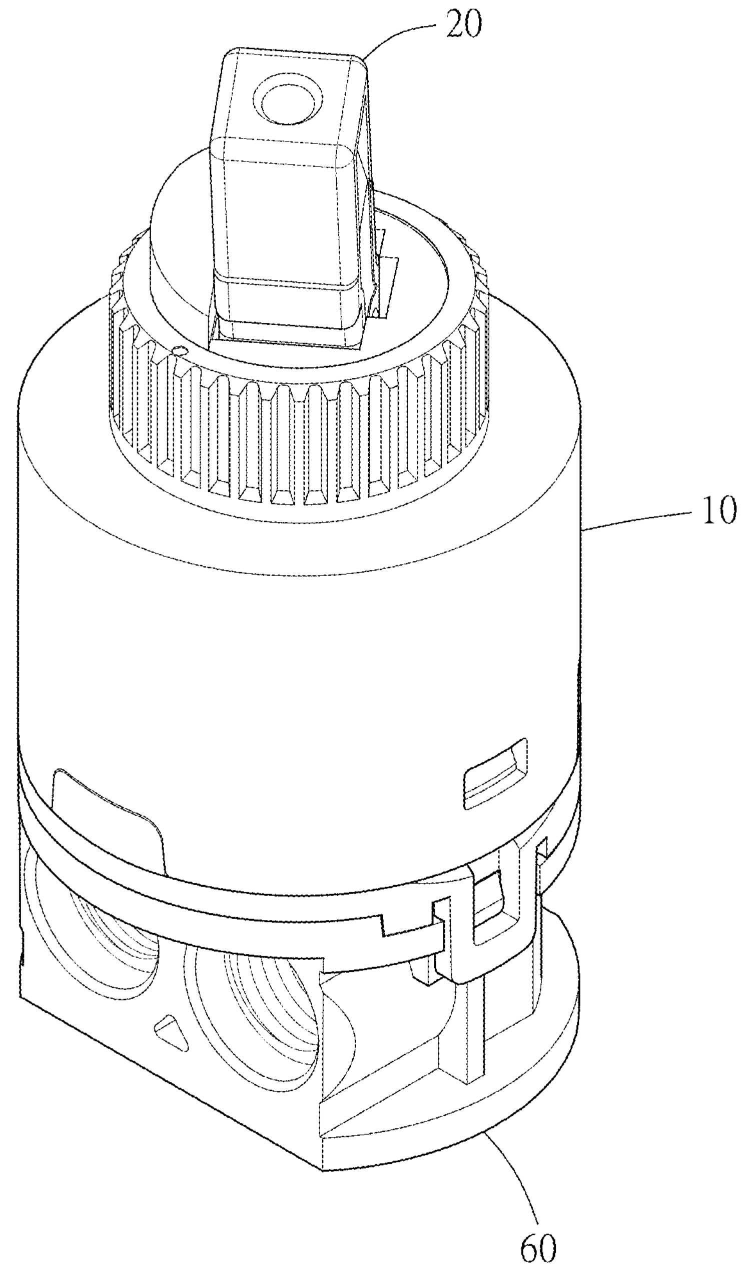
FIG. 1 is a perspective view of the first embodiment of the present invention.
Figure 2:
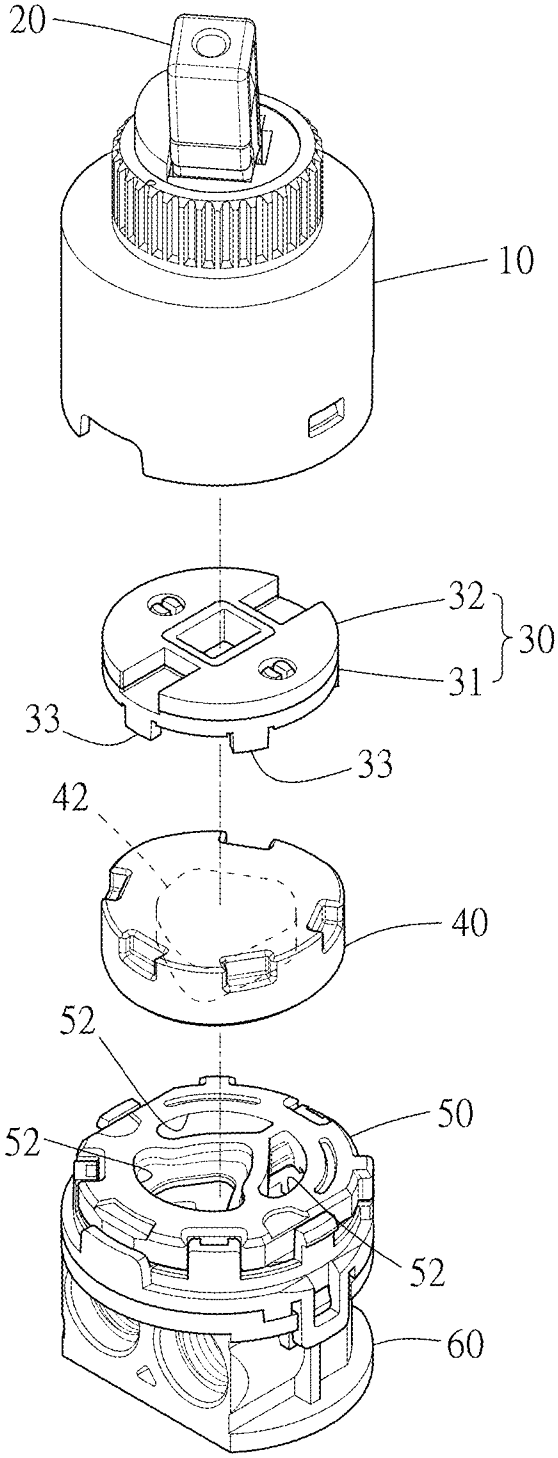
FIG. 2 is an exploded perspective view of the first embodiment of the present invention.
Figure 3:
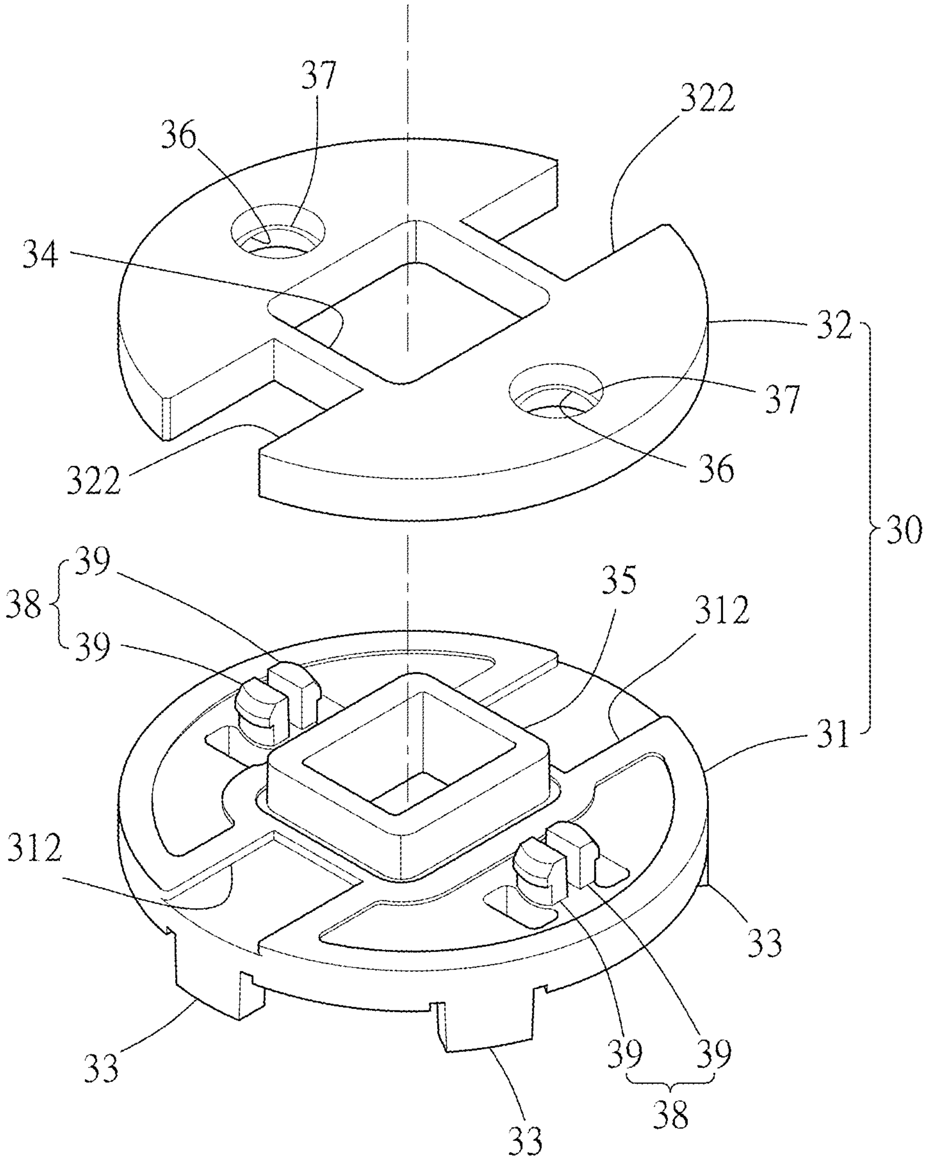
FIG. 3 is an exploded perspective view of the inner component of the first embodiment of the present invention.
Figure 4:
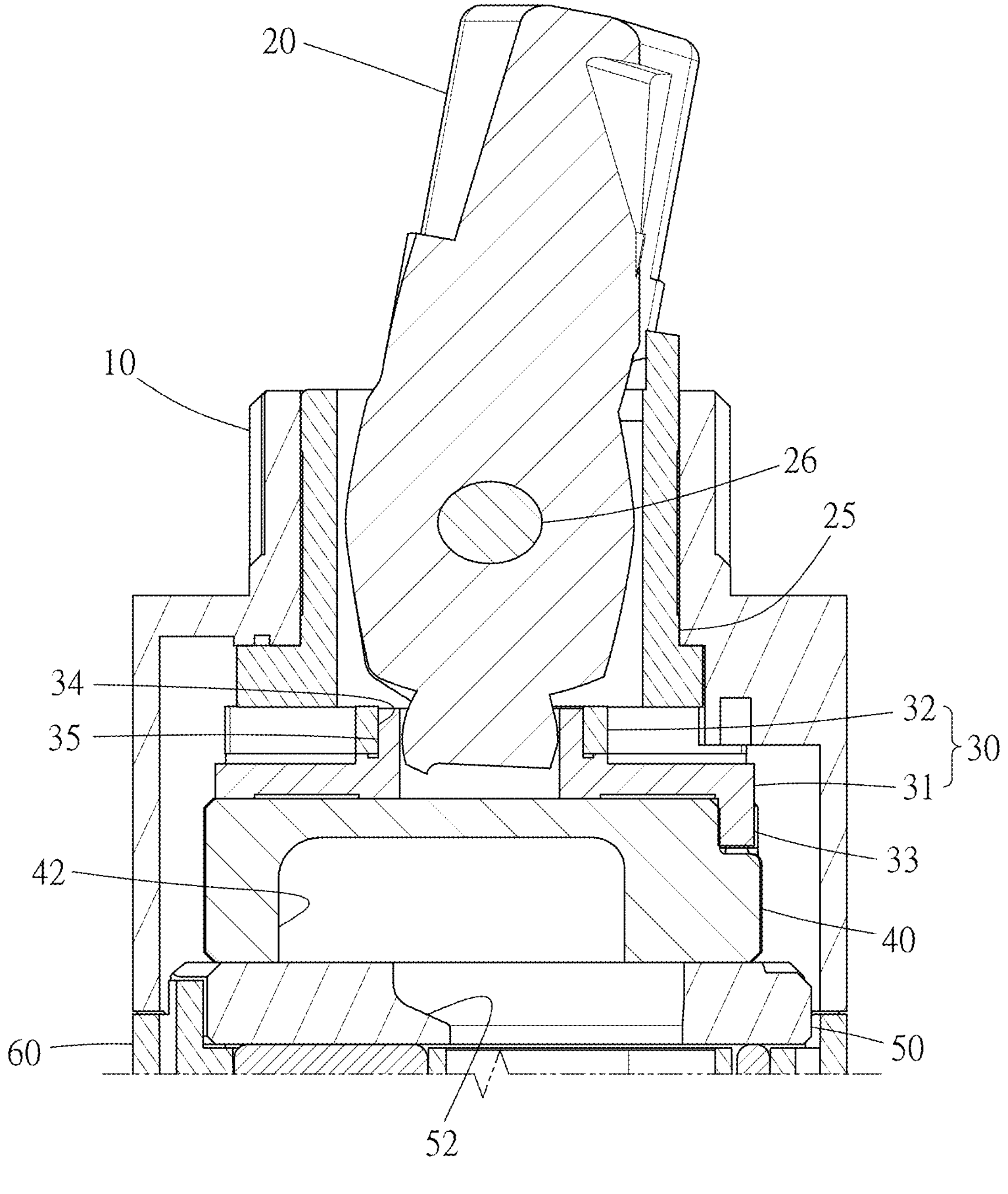
FIG. 4 is a partial sectional view of the first embodiment of the present invention.

The accompanying drawings show embodiments of a valve core according to the present invention. These embodiments are provided for illustrative purposes only and do not limit the scope of the patent application to the specific structures shown.

As shown in FIGS. 1 to 4, the first embodiment of the valve core comprises a valve body 10, a valve stem 20, a rotating seat 25, an inner component 30, a movable valve disc 40, a fixed valve disc 50, and a valve seat 60. The rotating seat 25, the inner component 30, the movable valve disc 40, and the fixed valve disc 50 are sequentially arranged along the axial direction within the valve body 10. The movable valve disc 40 and the fixed valve disc 50 are made of a ceramic material and are tightly stacked together. The fixed valve disc 50 includes multiple through slots 52, while the movable valve disc 40 has a confluence groove 42 on its side facing the fixed valve disc 50. The inner component 30 is connected to the movable valve disc 40 and is actuated by the valve stem 20 to drive the movement of the movable valve disc 40. The radial periphery of the inner component 30 is positioned adjacent to the valve body 10. The valve seat 60 is located at one end of the valve body 10, and the fixed valve disc 50 is connected to the valve seat 60. The valve stem 20 is pivotally connected to the rotating seat 25 via an axial rod 26. One end of the valve stem 20 is pivotally connected to the inner component 30, while the other end extends outward from the valve body 10. The construction described above will be familiar to those skilled in the art.

The fixed valve disc 50 is provided with three through slots 52, enabling the first embodiment to function as a mixing valve that adjusts the mixing ratio of cold and hot water at different temperatures. By varying the number of the through slots 52, alternative embodiments can be implemented, such as a flow control valve for regulating water flow.

The inner component 30 comprises an actuating disc 31 and a protective disc 32. The actuating disc 31 is a disc-shaped structure made of a resin material and is positioned on the side of the movable valve disc 40 opposite the fixed valve disc 50. The actuating disc 31 includes multiple clamping portions 33 for clamping the movable valve disc 40. The protective disc 32 is a disc-shaped structure made of a wear-resistant metallic material. The movable valve disc 40, the actuating disc 31, and the protective disc 32 are sequentially arranged along the axial direction. The protective disc 32 is positioned on the side of the actuating disc 31 opposite to the movable valve disc 40 and is connected to the actuating disc 31. The actuating disc 31 is located within the range of the normal projection of the protective disc 32 along its axial direction. Specifically, the radial dimension of the actuating disc 31 is less than or equal to that of the protective disc 32. In this embodiment, the radial dimensions of the actuating disc 31 and the protective disc 32 are equal.

During operation, as the valve stem 20 drives the inner component 30 to move or rotate, the actuating disc 31, being within the axial projection range of the protective disc 32, ensures that the protective disc 32, which is made of a wear-resistant metallic material, can withstand contact friction with the valve body 10. This arrangement allows the actuating disc 31 to maintain the intended trajectory required to drive the movable valve disc 40, while minimizing the risk of damage to or deformation of the protective disc 32.

When the first embodiment is used as a mixing valve to adjust the mixing ratio of two water sources at different temperatures, thermal energy from the high-temperature water source will be transferred to the inner component 30 through the fixed valve disc 50. This thermal energy may cause dimensional changes in the actuating disc 31 due to temperature variations. By making the actuating disc 31 and the protective disc 32 of different materials, the effect of the thermal energy on the dimensions of the protective disc 32 can be reduced. This ensures that the actuating disc 31 can maintain the desired trajectory to effectively drive the movable valve disc 40.

The protective disc 32 includes a connecting bore 34 extending along the axial direction, into which a connecting projection 35 of the actuating disc 31 is inserted. The connecting bore 34 is configured as a rectangular opening, while the connecting projection 35 is formed as a matching rectangular frame structure. The connecting projection 35 facilitates the connection of the valve stem 20, and the rectangular configuration of the connecting projection 35 and the connecting bore 34 enhances the ease of assembly between the actuating disc 31 and the protective disc 32.

The protective disc 32 further includes two engagement bores 36, each accompanied by a restraining portion 37 located within the respective engagement bore 36. The actuating disc 31 is equipped with two hook assemblies 38, each of which is inserted into one of the engagement bores 36 and engages with the corresponding restraining portion 37. Specifically, each hook assembly 38 comprises two opposing locking hooks 39. Each locking hook 39 engages with its spatially corresponding restraining portion 37, ensuring secure assembly and structural stability.

The protective disc 32 also forms two peripheral notches 322, each of which extends to the radial periphery of the protective disc 32. On the side facing the protective disc 32, the actuating disc 31 features two mating recesses 312, each of which is recessed toward the movable valve disc 40, and each of which corresponds to a respective peripheral notch 322.

Figure 5:
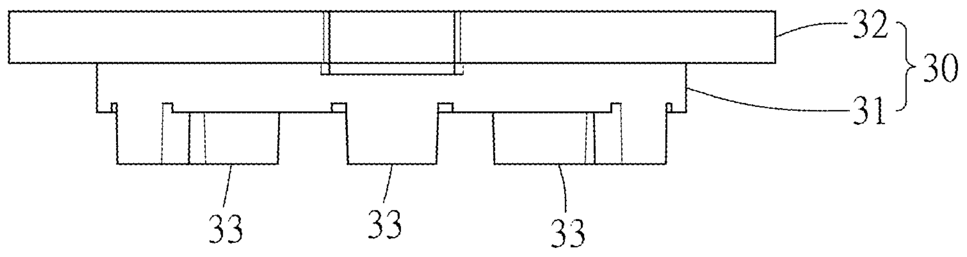
FIG. 5 is a side view of the inner component of the second embodiment of the present invention.

As shown in FIG. 5, the primary difference between the second embodiment and the first embodiment lies in the radial dimensions of the actuating disc 31. In the second embodiment, the radial dimension of the actuating disc 31 is smaller than that of the protective disc 32.

The invention claimed is:

1. A valve core comprising:

a valve body;

a valve stem;

a rotating seat:

an inner component;

a movable valve disc;

a fixed valve disc; and a valve seat, wherein said rotating seat and said inner component and said movable valve disc said fixed valve disc are sequentially arranged along an axial direction with said valve body, said movable valve disc and said fixed valve disc being formed of a ceramic material and being stacked together, wherein said fixed valve disc has multiple through slots, said movable valve disc having a confluence groove on a side that faces a side of said fixed valve disc, said inner component being connected to said movable valve disc, said valve stem driving said movable valve disc, wherein a periphery of said inner component is positioned adjacent to said valve body, said valve seat being assembled at one end of said valve body, said valve seat being connected to said fixed valve disc said valve stem being pivotally connected to said rotating seat via a rod, one end of said valve stem being pivotally connected to said inner component, another end of said valve stem extending outwardly of said valve body, wherein said inner component comprises:

an actuating disc formed of a resin material, said actuating disc having multiple clamping portions on a side opposite a protective disc, the multiple clamping portions adapted to clamp said movable valve disc, the protective disc being formed of wear-resistant metallic material, the protective disc being connected to said actuating disc, wherein said actuating disc and said protective disc are arranged sequentially along an axis, wherein a dimension of said actuating disc is no more than a radial dimension of the protective disc.

2. The valve core according to of claim 1, wherein the protective disc has a connecting bore extending along the axis, said actuating disc having a connecting projection insertable into the connecting bore.

3. The valve core of claim 1, wherein the protective disc has a pair of engagement bores, each engagement bore of the pair of engagement bores having a restraining portion located within a respective engagement bore, said actuating disc having a pair of hook assemblies, each hook assembly of the pair of hook assemblies being insertable into the respective engagement bore and engageable with the corresponding restraining portion.

4. The valve core of claim 3, wherein each hook assembly of the pair of hook assemblies comprises a pair of locking hooks, each locking hook of the pair of locking hooks engaging with the corresponding restraining portion.

5. The valve core of claim 1, wherein the protective disc has a pair of peripheral notches, each peripheral notch of the pair of peripheral notches extending to the periphery of the protective disc, said actuating disc having a pair of mating recesses on the side of said actuating disc facing the protective disc, the pair of mating recess being recessed toward said movable valve disc, each mating recess of the pair of mating recesses corresponding to the respective peripheral notch.

6. An inner component used for installation in a valve core, the inner component being controlled by a valve stem driving a movable valve disc, the inner component comprising:

an actuating disc formed of a resin material, said actuating disc having multiple clamping portions on the side opposite a protective disc, the multiple clamping portions adapted to clamp the movable valve disc, the protective disc being formed of a wear-resistant metallic material, said protective disc being connected to said actuating disc, wherein said actuating disc and the protective disc being arranged sequentially along an axis, wherein a radial dimension of said actuating disc is no greater than a radial dimension of the protective disc.

7. The inner component of claim 6, wherein the protective disc has a connecting bore extending along the axis, said actuating disc having a connecting projection insertable into the connecting bore.

8. The inner component of claim 6, wherein the protective disc has a pair of engagement bores, each engagement bore of the pair of engagement bores having a restraining portion located within the respective engagement bore, said actuating disc having a pair of hook assemblies, each hook assembly of the pair of hook assemblies being insertable into a respective engagement bore and engageable with the restraining portion.

9. The inner component of claim 8, wherein each hook assembly of the pair of hook assemblies having a pair of opposing locking hooks, each locking hook of the pair of opposing locking hooks engageable with the restraining portion.

10. The inner component of claim 6, wherein the protective disc has a pair of peripheral notches, each peripheral notch of the pair of peripheral notches extending to a periphery of the protective disc, the actuating disc having a pair of mating recesses on a side facing the protective disc, the pair of mating recesses being recessed to said movable valve disc, each mating recess of the pair of mating recesses corresponding to a respective peripheral notch.

* * * * *